(12) United States Patent
Hegde et al.

(10) Patent No.: US 11,354,495 B2
(45) Date of Patent: *Jun. 7, 2022

(54) SYSTEM AND METHOD FOR RELIABLE EXTRACTION AND MAPPING OF DATA TO AND FROM CUSTOMER FORMS

(71) Applicant: Intuit Inc., Mountain View, CA (US)

(72) Inventors: Prabhat Hegde, Bangalore (IN); Bala Dutt, Bangalore (IN); Sivaraj Iyamperumal, Bengaluru (IN); Roshni Neogy, Kolkata (IN); Anurag Tyagi, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/091,273

(22) Filed: Nov. 6, 2020

(65) Prior Publication Data

US 2021/0056259 A1    Feb. 25, 2021

Related U.S. Application Data

(63) Continuation of application No. 15/854,479, filed on Dec. 26, 2017, now Pat. No. 10,853,567.

(30) Foreign Application Priority Data

Oct. 28, 2017 (IN) .............................. 201721038339

(51) Int. Cl.
*G06F 40/186* (2020.01)
*H04L 67/52* (2022.01)
(Continued)

(52) U.S. Cl.
CPC .......... *G06F 40/186* (2020.01); *G06F 16/337* (2019.01); *G06F 16/93* (2019.01); *G06Q 40/06* (2013.01); *H04L 67/18* (2013.01)

(58) Field of Classification Search
CPC . G06F 16/20; G06F 16/30; G06F 3/04; G06F 40/186; G06F 40/00; G06F 16/93; G06F 16/337; H04L 67/18; G06Q 40/06
See application file for complete search history.

(56) References Cited

U.S. PATENT DOCUMENTS 6,460,042 B1   10/2002   Hitchcock et al.
7,139,757 B1   11/2006   Apollonsky
(Continued)

FOREIGN PATENT DOCUMENTS

WO        0106416 A2    1/2001

OTHER PUBLICATIONS

Pacific Coast Bankers' Bank Joins Bankers Bank Network of NetPrecision Internet Home Banking Resellers, Business Editors, Business Wire, New York, 4-pages, Feb. 16, 1999.

*Primary Examiner* — Sanchita Roy
(74) *Attorney, Agent, or Firm* — Paradice and Li LLP

(57) ABSTRACT

A method and system generate customized financial document templates in a document preparation system, according to one embodiment. The method and system receive document data from a user corresponding to a document including a plurality of custom data fields in a custom template. The method and system map the custom data fields to system data fields from a relatively small subset of data fields selected from a system data field pool based on the characteristics of the user. The method and system generate a custom form template based on the document data and the mapping of the custom data fields to system data fields.

20 Claims, 3 Drawing Sheets

(51) Int. Cl.
*G06Q 40/06* (2012.01)
*G06F 16/93* (2019.01)
*G06F 16/335* (2019.01)

(56) References Cited

U.S. PATENT DOCUMENTS

| | | |
|---|---|---|
| 7,653,622 B2 | 1/2010 | Huentelman et al. |
| 7,813,989 B2 | 10/2010 | Jones et al. |
| 8,204,805 B2 | 6/2012 | Eftekhari et al. |
| 8,572,083 B1 | 10/2013 | Snell et al. |
| 8,706,762 B1 | 4/2014 | Patzer et al. |
| 8,731,973 B2 | 5/2014 | Anderson et al. |
| 8,775,416 B2 | 7/2014 | Heck |
| 8,924,236 B2 | 12/2014 | Marchosky |
| 9,542,710 B1 | 1/2017 | Izrailevsky et al. |
| 9,934,213 B1 | 4/2018 | Dutt et al. |
| 10,762,581 B1 | 9/2020 | Dutt et al. |
| 11,120,512 B1 | 9/2021 | Dutt et al. |
| 2002/0174196 A1 | 11/2002 | Donohoe et al. |
| 2003/0188260 A1 | 10/2003 | Jensen et al. |
| 2004/0254953 A1 | 12/2004 | Vincent |
| 2006/0007189 A1 | 1/2006 | Gaines et al. |
| 2007/0073519 A1 | 3/2007 | Long |
| 2007/0168382 A1 | 7/2007 | Tillberg et al. |
| 2008/0086352 A1 | 4/2008 | Hibbert et al. |
| 2008/0154824 A1 | 6/2008 | Weir et al. |
| 2008/0235319 A1 | 9/2008 | Zargham et al. |
| 2009/0074303 A1 | 3/2009 | Filimonova et al. |
| 2009/0144157 A1 | 6/2009 | Saracino et al. |
| 2010/0179860 A1 | 7/2010 | Noel et al. |
| 2011/0066585 A1* | 3/2011 | Subrahmanyam ..... G06N 7/005 706/52 |
| 2011/0179036 A1 | 7/2011 | French et al. |
| 2011/0184863 A1 | 7/2011 | Coleman et al. |
| 2011/0222776 A1 | 9/2011 | Jiang et al. |
| 2011/0252313 A1 | 10/2011 | Tanushree et al. |
| 2011/0276493 A1 | 11/2011 | Graham, III et al. |
| 2012/0123996 A1 | 5/2012 | Krinsky |
| 2012/0150888 A1 | 6/2012 | Hyatt et al. |
| 2013/0318426 A1 | 11/2013 | Shu et al. |
| 2014/0108456 A1 | 4/2014 | Ramachandrula et al. |
| 2014/0195891 A1 | 7/2014 | Venkata Radha Krishna Rao et al. |
| 2014/0207631 A1 | 7/2014 | Fisher |
| 2015/0046224 A1 | 2/2015 | Adjaoute |
| 2016/0379186 A1 | 12/2016 | Smith et al. |
| 2018/0101760 A1 | 4/2018 | Nelson et al. |
| 2019/0129931 A1 | 5/2019 | Hegde et al. |
| 2022/0005127 A1 | 1/2022 | Dutt et al. |

* cited by examiner

SYSTEM AND METHOD FOR RELIABLE EXTRACTION AND MAPPING OF DATA TO AND FROM CUSTOMER FORMS

CROSS-REFERENCE TO RELATED APPLICATION

This application is a continuation application and claims priority to India Patent Application 201721038339 entitled "SYSTEM AND METHOD FOR RELIABLE EXTRACTION AND MAPPING OF DATA TO AND FROM CUSTOMER FORMS" and filed on Oct. 28, 2017, and U.S. patent application Ser. No. 15/854,479 entitled "SYSTEM AND METHOD FOR RELIABLE EXTRACTION AND MAPPING OF DATA TO AND FROM CUSTOMER FORMS" and filed on Dec. 26, 2017, now U.S. Pat. No. 10,853,567, which is assigned to the assignee hereof. The disclosures of all prior Applications are considered part of and are incorporated by reference in this Patent Application.

BACKGROUND

Traditional data management systems, including document preparation systems such as financial management systems, provide and utilize templates to facilitate the generation of forms such as invoices, estimates, statements, receipts, and many more. Traditional data management systems, such as small business bookkeeping systems, retain form templates and assist users to populate the form templates in order to generate financial documents that can be utilized by users in managing their businesses. Accordingly, data management systems represent a potentially beneficial tool to assist users in managing their activities, such as finances.

However, traditional data management systems are generally limited to supporting and populating form templates that are generated by the data management system. This can represent a serious drawback to potential users that utilize their own custom form templates for generating various documents, such as financial documents. For many potential users of traditional data management systems, abandoning their custom form templates for those supported by traditional data management systems is a deterrent to utilizing the services of the traditional data management systems. For example, a potential user may not want to switch form templates because the potential user may not want to inconvenience his/her customers with invoices, estimates, and receipts of varying formats. In the addition, potential users themselves may desire to keep the same look and feel of their forms for their own convenience and processing ease.

Some traditional data management systems have sought to enable users to generate or utilize their own custom form templates with the data management system. In order for the traditional data management systems to assist the user to generate documents by populating data fields of the custom form template, the traditional data management systems must understand the nature of each data field in the custom form template. Because the custom form template likely uses data field designations selected by the user, those data field designations will not perfectly align with data field designations recognized by the traditional data management systems. Accordingly, before the traditional data management systems can incorporate custom form templates, the traditional data management systems force the user to manually match each data field designation in the custom form template to a data field designation recognized by the traditional data management systems.

However, the mapping process required by traditional data management systems is often highly problematic for users. For example, during the mapping process some traditional data management systems present to the user a very large list of recognized data field designations and ask the user to map each data field designation from the custom form template to one of the recognized data field designations. In a one-size-fits-all approach, the traditional data management systems present lists of recognized data field designations that include recognized data field designations for very large number of different types of documents, as well as data field designations particular to various regions and user/business types. Accordingly, users spend large amounts of time and resources mapping data field designations from the custom form template to recognize data field designations.

Furthermore, users are often unable to select a correct recognized data field designation from among the large number of recognized data field designations. If users select incorrect data field designations during the mapping process, then the traditional data management systems may incorrectly populate documents for the users. Incorrectly populated documents can have serious adverse consequences for the users including wasted money, incorrect understanding of the users' finances, loss of customers, and even legal problems when error laden financial reporting does not comply with government regulations.

These issues and drawbacks are not limited to financial management systems. Any electronic document preparation system that assists users to electronically fill out forms or prepare documents can suffer from these drawbacks when users wish to bring their own custom form templates to the document preparation system.

What is needed is a method and system that provides a technical solution to the technical problem of accurately and efficiently incorporating custom user form templates into a document preparation system.

SUMMARY

Embodiments of the present disclosure provide one or more technical solutions to the technical problem of electronic document preparation systems that are not able to accurately and efficiently incorporate custom form templates. The technical solutions include selecting a document customization interface based on characteristics of the user and presenting to the user a custom form template incorporation process that is tailored to the user. When the user selects to enter a custom document importation process, the document preparation system prompts the user to select a document type corresponding to a type of the custom form template to be incorporated into the document preparation system. The user then uploads user document data corresponding to a custom user document including a plurality of custom data fields. The document preparation system selects a subset of system data fields from a large pool of system data fields, based on both the document type selected by the user and on the characteristics of the user. The document preparation system automatically maps each custom data field to a respective system data field from the subset of system data fields. Because the subset of system data fields is smaller than the total pool of system data fields and includes only system data fields selected based on the document type and the characteristics of the user, the document preparation system can efficiently and accurately map each custom data field to a system data field. The document preparation system generates custom form template data corresponding to the template of the document data and incorporating the mapping of the custom data fields to the system data fields. The document preparation system can now generate documents for the user by populating the data fields of the custom form template.

Embodiments of the present disclosure overcome the drawbacks of traditional electronic document preparation systems that require the user to undergo a confusing, inefficient, and error-prone mapping process in order to incorporate a custom user template. Embodiments of the present disclosure also overcome the drawbacks of traditional electronic document preparation systems by providing a personalized interface to the user for incorporating custom form templates and by automatically, accurately, and efficiently mapping custom data field names to system data field names from a customized pool of system data field names based on the characteristics of the user.

Figure 1:
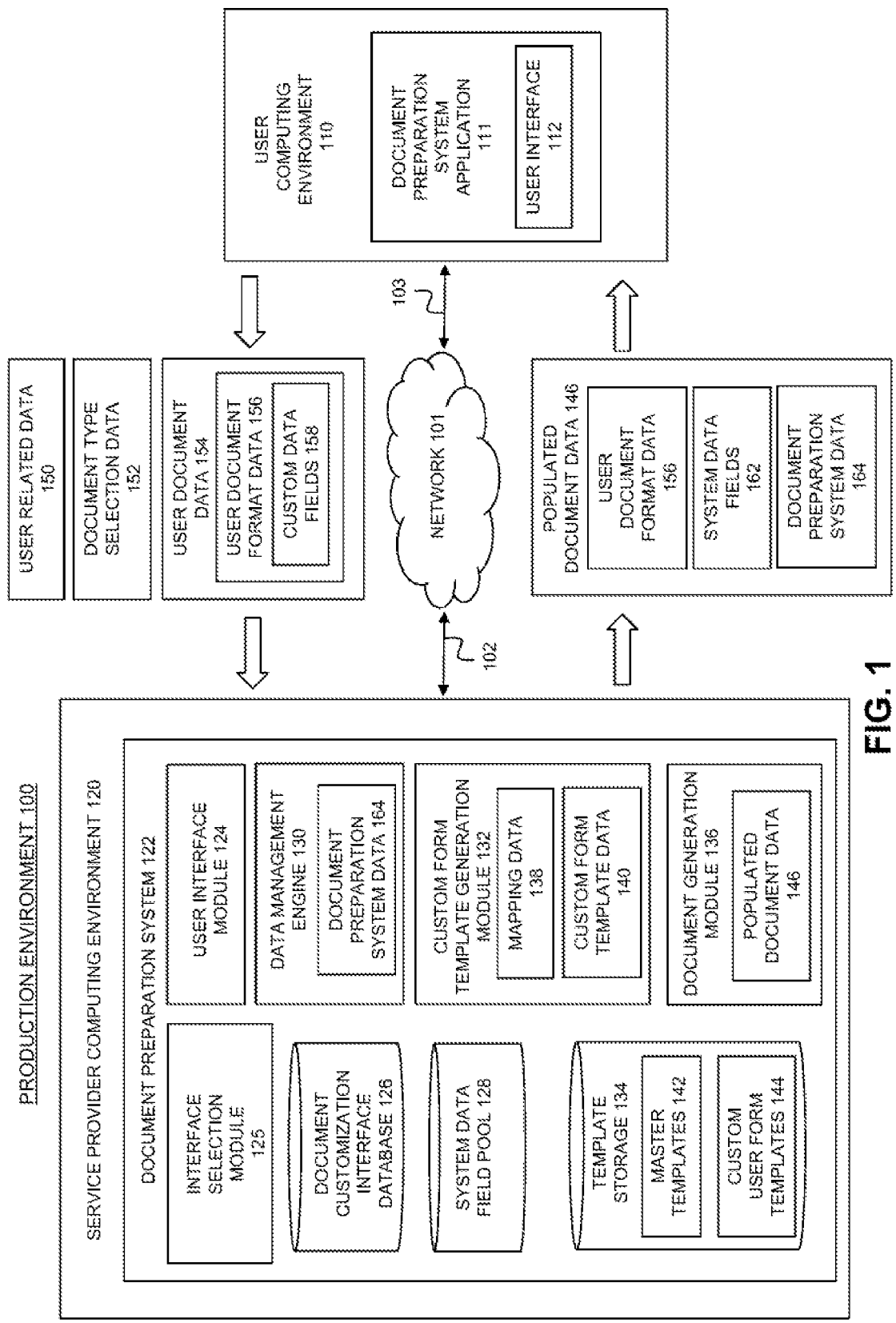
FIG. 1 is a block diagram of a hardware architecture for providing customized form templates with a document preparation system, in accordance with one embodiment.

Common reference numerals are used throughout the FIGS. and the detailed description to indicate like elements. One skilled in the art will readily recognize that the above FIGS. are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

Introductory System

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party. Examples of trusted computing environments include the assets and components making up data centers associated with, and/or controlled by, an application and/or any computing systems and/or virtual assets, and/or networks of computing systems and/or virtual assets, associated with, known by, and/or controlled by, an application.

In contrast, unknown, or untrusted computing environments are environments and systems where the assets, components, infrastructure, communication and networking systems, and security systems implemented and associated with the computing systems and/or virtual assets making up the untrusted computing environment, are not under the control of, and/or are not known by, a party, and/or are dynamically configured with new elements capable of being added that are unknown to the party. Examples of untrusted computing environments include, but are not limited to, public networks, such as the Internet, various cloud-based computing environments, and various other forms of distributed computing systems.

In various embodiments, each computing environment includes allocated assets and virtual assets associated with, and controlled or used to create, and/or deploy, and/or operate an application.

It is often the case that to create, and/or deploy, and/or operate an application, application data must be transferred between an untrusted computing environment and a trusted computing environment. However, in other situations a party may wish to transfer data between two trusted computing environments, and/or two untrusted computing environments.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

Typically, virtual assets are created, or instantiated, using steps, instructions, processes, code, or "recipes" referred to herein as "virtual asset creation templates." Typically, virtual assets that have the same, or similar, operational parameters are created using the same or similar "virtual asset creation templates."

Examples of virtual asset creation templates include, but are not limited to, any tool and/or system for creating and managing a collection of related cloud resources. Illustrative examples of such a virtual asset creation template are any of the cloud formation templates/tools provided by Amazon Web Service (AWS), Rack Space, Joyent, and/or any other of the numerous cloud based infrastructure providers.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the terms "forms" and/or "financial forms" include, but are not limited to, invoices, credit memos, sales receipts, sales orders, purchase orders, statements, estimates, and any other document that is currently used or that may be used for tracking, identifying, or otherwise managing the transfer of services and/or goods from one party to another, or for the management of data, resources, activities, and/or transactions.

In one embodiment, a document preparation system implements a method including receiving with a document preparation system, user related data related to a user. In one embodiment, the method includes selecting, from a pool of document customization interfaces, a document customization interface based on the user data, and prompting the user to select a document type. In one embodiment, the method includes receiving document type selection data from the user indicating a document type selection made by the user. In one embodiment, the method includes receiving, from the user, user document data corresponding to a document of the user and including a plurality of custom data fields, and generating mapping data by mapping each custom data field to one of a plurality of system data fields selected from a subset of system data fields. In one embodiment, the subset of system data fields is selected from a pool of system data fields in accordance with the document customization interface and the document type. In one embodiment, the method includes generating custom form template data based on the mapping data and corresponding to a custom form template based on the user document data.

In one embodiment, the document preparation system selects the document customization interface based, at least in part, on a geolocation of the user as indicated by the user related data. In one embodiment, the pool of system data fields is based, in part, on regional preferences associated with the geolocation of the user.

In one embodiment, the document preparation system selects the document customization interface based on previous interactions of the user with the document preparation system.

In one embodiment, the document preparation system generates the document customization interface by adjusting a previous document customization interface based on selections made by the user.

In one embodiment, the document customization interface is an application programming interface utilized by the document preparation system to facilitate generating the custom form template data.

In one embodiment, if the document preparation system is not able to map a custom data field to a system data field name, the document preparation system presents to the user an indication of the custom data field that the document preparation system was not able to map to a system data field. In one embodiment, the document preparation system prompts the user to select a system data field from the pool of system data fields for the unmapped custom data field.

In one embodiment, the document preparation system prompts the user to select a function that identifies how to populate the custom data field corresponding to the unmapped custom data field name.

In one embodiment, the document preparation system generates populated document data corresponding to a populated document by populating the custom data fields of the custom form template data in accordance with document preparation system data and functions associated with the system data fields mapped to the custom data fields.

In one embodiment, the document preparation system outputs the populated document data to the user. In one embodiment, the document preparation system outputs the populated document data to a third party associated with the user.

In one embodiment, the document preparation system generates populated document data corresponding to multiple populated documents by populating the custom data fields of the custom form template data based on document preparation system data.

In one embodiment, the document preparation system is a financial management system.

In one embodiment, the document preparation system is a book keeping system configured to generate populated document data for the user based on financial management data associated with the user. In one embodiment, the custom form template data corresponds to a custom template for one or more of an invoice, a bill, a financial estimate, a financial statement, a tax document, and a receipt.

In one embodiment, the document preparation system prompts the user to a marking characters into the user document data, the marking characters indicating locations of the custom data fields in the user document data.

In one embodiment, the document preparation system implements machine learning processes to adjust and generate document customization interfaces based on interactions with users of the document preparation system.

Embodiments of the present disclosure address some of the shortcomings associated with traditional document preparation systems that either do not enable importation of custom templates or that force users to undergo a confusing, resource intensive, and error prone data field mapping process. An electronic document preparation system in accordance with one or more embodiments facilitates efficient and accurate importation of custom document templates. The various embodiments of the disclosure can be implemented to improve the technical fields of data processing, electronic document preparation, data transmission, data analysis, and data collection. Therefore, the various described embodiments of the disclosure and their associated benefits amount to significantly more than an abstract idea.

Using the disclosed embodiments of a method and system for providing customized form templates with a document preparation system, a method and system for providing customized form templates with a document preparation system more accurately is provided. Therefore, the disclosed embodiments provide a technical solution to the long standing technical problem of efficiently and accurately importing custom form templates in an electronic document preparation system.

In addition, the disclosed embodiments of a method and system for providing customized form templates with a document preparation system are also capable of dynamically adapting to constantly changing fields such as financial book keeping and other kinds of document preparation. Consequently, the disclosed embodiments of a method and system for providing customized form templates with a document preparation system also provide a technical solution to the long standing technical problem of static and inflexible electronic document preparation systems.

The result is a much more accurate, adaptable, and robust method and system for providing customized form templates with a document preparation system. This, in turn, results in: less human and processor resources being dedicated to analyzing new forms because more accurate and efficient analysis methods can be implemented, i.e., usage of fewer processing resources, usage of fewer memory storage assets, and less communication bandwidth being utilized to transmit data for analysis.

The disclosed method and system for providing customized form templates with a document preparation system does not encompass, embody, or preclude other forms of innovation in the area of electronic document preparation systems. In addition, the disclosed method and system for providing customized form templates with a document preparation system is not related to any fundamental economic practice, fundamental data processing practice, mental steps, or pen and paper based solutions, and is, in fact, directed to providing solutions to new and existing problems associated with electronic document preparation systems. Consequently, the disclosed method and system for providing customized form templates with a document preparation system, does not encompass, and is not merely, an abstract idea or concept.

Hardware Architecture

FIG. 1 illustrates a block diagram of a production environment 100 for providing customized form templates with a document preparation system, according to one embodiment. The production environment 100 is configured to enable users to export custom user form templates to a document preparation system, so that the document preparation system can generate populated documents for the user based on the users' own templates instead of templates defined by the document preparation system. The production environment receives user related data and selects a document customization interface based on the user related data. The user uploads a user document to the document preparation system. The user document includes custom data fields that differ from system data fields used by the document preparation system's own form templates. The document preparation system maps the custom data fields to system data fields. The document preparation system makes the mapping process efficient and accurate by limiting the possible selection of system data fields based on the selected document customization interface and the document type selected by the user. The document preparation system generates custom form template data based on the user document data and the mapping data. The document preparation system can then utilize the custom form template data to generate populated documents for the user with the user's own custom format.

In addition, the disclosed method and system for providing customized form templates with a document preparation system provides for significant improvements to the technical fields of electronic document preparation, data processing, data management, and user experience.

In addition, as discussed above, the disclosed method and system for providing customized form templates with a document preparation system provide for the processing and storing of smaller amounts of data, i.e., provide for more efficient analysis of forms and data; thereby eliminating unnecessary data analysis and storage. Consequently, using the disclosed method and system for providing customized form templates with a document preparation system results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for providing customized form templates with a document preparation system.

Referring to FIG. 1, the production environment 100 includes a user computing environment 110 and a service provider computing environment 120 for providing customized form templates with a document preparation system, according to one embodiment. The computing environments 110 and 120 are communicatively coupled to each other through a network 101, with a communication channel 102, and with a communication channel 103, according to one embodiment.

In one embodiment, the service provider computing environment 120 provides a document preparation system 122. The document preparation system 122 assists users to prepare documents of various kinds. Typically, the users provide data to the document preparation system 122, or the document preparation system 122 gathers data about the user from other sources. The document preparation system 122 then generates documents by populating form templates in accordance with the data provided by the users and designated functions associated with the various data fields of the form templates.

In one embodiment, the document preparation system 122 includes system form templates generated by the document preparation system 122. Users of the document preparation system 122 can select system form templates and can provide user related data to the document preparation system 122. The document preparation system 122 will then generate documents for the users by populating the data fields of the system form based template on the user related data.

However, in many cases users may desire to have the document preparation system 122 generate documents for the users based on custom form templates of the users. For example, prior to adopting the services of the document preparation system 122, many users have prepared their own documents based on their own custom form templates. The users' associates, clients, and customers have come to recognize documents associated with the users based on the custom templates. Accordingly, in order to maintain this recognition, as well as for convenience and efficiency, many users desire to bring their own custom form templates to the document preparation system 122 so that the document preparation system 122 can generate populated documents based on the custom form templates.

In traditional document preparation systems 122, users are either unable to import their custom form templates, or the processes for importing custom form templates are very confusing, inefficient, and error-prone. For example, many traditional document preparation systems 122 implement a one-size-fits-all process for importing custom form templates in which users must manually map data fields from custom form templates to system data fields by selecting among hundreds or thousands of possible system data fields. These cumbersome processes of traditional document preparation systems 122 can cause users to become frustrated with the traditional document preparation systems, in addition to expending large amounts of computing and human resources.

In one embodiment, the document preparation system 122 overcomes the drawbacks of these traditional document preparation systems by providing an efficient, accurate, and more personalized custom form template importation process. In particular, when a user accesses a custom form template importation feature of the document preparation system 122, the document preparation system 122 selects a document customization interface based on the characteristics of the user. The document preparation system 122 then asks the user what type of document the user would like to upload. The document preparation system 122 then prompts the user to upload a custom user form template having a plurality of custom data fields. The selected document customization interface retrieves a relatively small number of possible system data fields based on the characteristics of the user. Due to the relatively small and personalized subset of possible system data fields, the document preparation system 122 can automatically map each custom data field from the custom user form template to the proper system data field in the personalized subset of system data fields. After this simple document customization process, the document preparation system 122 is able to generate populated documents for the user including the custom form template with data fields populated based on document preparation system data related to the user.

In one embodiment, the document preparation system 122 is a financial management system. The financial management system can include one or more of a book keeping system, an accounting system, a personal data management system, a budgeting system, or a tax return preparation system. The financial management system generates financial related documents for the users. The financial related documents can include invoices, bills, financial estimates, financial statements, tax documents, or other kinds of financial related documents.

In an example in which the document preparation system 122 is a bookkeeping system, the document preparation system 122 may generate invoices, bills, estimates, or financial statements for the users and for customers, clients, associates, partners, or other third parties associated with the users. A user of the book keeping system may have a custom format that the user has used for many years for generating invoices. The clients of the user may have come to recognize invoices associated with the user based on the custom format of the user's invoices. The user may wish to maintain this custom format for invoices when the user adopts the services of the book keeping system. The user accesses a document customization service of the book keeping system. The book keeping system identifies characteristics of the user, such as where the user is located, what type of business the user operates, financial data associated with the user, demographic data of the user, and other kinds of characteristics.

The book keeping system selects a document customization interface based on these characteristics. The book keeping system prompts the user to select the type of document that the user would like to import. The user selects "invoice" from a list presented by the document preparation system in accordance with the selected document customization interface. The user then uploads a custom invoice template of the user to the bookkeeping system. The custom invoice template of the user includes custom data fields with custom designations or names.

The bookkeeping system identifies a pool of system data fields based on the selected document customization interface. The bookkeeping system executes one or more algorithms that quickly and efficiently map each custom data field to a respective recognized system data field. The bookkeeping system generates custom form template data corresponding to the imported custom invoice template of the user and including mapping data that identifies how each custom data field relates to system data fields. The bookkeeping system can then generate invoices for the user including the user's custom template by populating the user's custom template based on financial management data associated with the user and the customer of the user for whom the invoice is generated.

Referring to FIG. 1, in one embodiment, the user computing environment 110 transmits, uploads, or otherwise transfers user document data 154 to the service provider computing environment 120 (e.g., over the network 101). The user document data 154 corresponds to a document of the user such as a custom user template, or an example document of the user implementing a custom user template. The user document data 154 includes user document format data 156 indicating a format of the user document. The user document format data 156 includes custom data fields 158. The custom data fields 158 can include custom data field names or designations associated with the custom data fields.

In one embodiment, the service provider computing environment 120 incorporates the user document data 154, and transmits, downloads, or otherwise transfers populated document data 146 to the user computing environment 110 corresponding to a populated document in accordance with the template of the user document data 154. The populated document data 146 includes the user document format data 156 from the user document data 154, system data fields 162 mapped to the custom data fields 158, and document preparation system data 164 populating the system data fields 162.

The user computing environment 110 includes one or more computing systems that are configured to transmit information to the service provider computing environment 120 and that are configured to receive information from the service provider computing environment 120 to enable a user to receive document preparation services from the service provider computing environment 120, according to one embodiment. The user computing environment 110 includes a document preparation system application 111, according to one embodiment. The document preparation system application 111 includes a subset of document preparation system features that are available from the service provider computing environment 120, according to one embodiment. For example, the document preparation system application 111 includes a user interface 112 that enables a user to view, add, remove, and/or otherwise manage financial data and/or information stored by and/or within the document preparation system 122, according to one embodiment. Through the user computing environment 110, the user uploads the user document data 154 to enable the document preparation system 122 to convert the user document data 154 into a form template, and to enable the document preparation system 122 to populate the generated form template with data from the document preparation system 122, according to one embodiment.

The service provider computing environment 120 represents one or more computing systems such as, but not limited to, a server, a distribution center that is configured to receive, execute, and host one or more document preparation systems or applications for access by one or more users, e.g., the user computing environment 110, according to one embodiment. The service provider computing environment 120 can be a traditional data center, a virtual asset computing environment (e.g., cloud computing environment), and/or a hybrid between a traditional data center and a virtual asset computing environment, according to one embodiment. The service provider computing environment 120 includes a document preparation system 122 that is configured to automatically identify and/or automatically map data from the user document data 154 to system data fields of the document preparation system 122, and to generate the populated document data 146, at least partially based on the receipt of the user document data 154, according to one embodiment.

The document preparation system 122 includes various components, databases, engines, modules, and data to support the automated identification and mapping of data in a user form to data fields of the document preparation system, according to one embodiment. The document preparation system 122 includes a user interface module 124, an interface selection module 125, a document customization interface database 126, a system data field pool 128, a data management engine 130, a custom form template generation module 132, a template storage 134, and a document generation module 136, according to various embodiments.

The document preparation system 122 employs the user interface module 124 to provide custom form template generation services to the user, to receive the user document data 154 from the user, and to provide the populated document data 146 to the user, according to one embodiment. The user interface module 124 is accessible by the user computing environment 110 through a web browser or through the user interface 112 of the document preparation system application 111, installed within the user computing environment 110, according to one embodiment. The user interface includes, but is not limited to, one or more dialog boxes, buttons, menus, directories, thumbnails, text boxes, radio buttons, check boxes, and other user interface elements to enable the user to interact with the document preparation system 122.

The user interface module 124 is configured to enable the user to upload the user document data 154 and to optionally enable the user to identify custom data fields 158 (e.g., dynamic data regions) in the user document data 154 for the document preparation system 122, according to one embodiment. The user interface module 124 includes a page for importing custom form styles, and includes a page that enables the user to browse for a particular form (e.g., an invoice or an estimate), according to one embodiment.

According to an embodiment, the document customization interface database 126 includes a plurality of variable document customization interfaces that can be implemented by document preparation system 122 to facilitate importation of custom for templates. The document customization interface database 126 includes document customization interfaces that are tailored to characteristics of users that will use the document preparation system 122. The document customization interface database 126 can include document customization interfaces for users from particular regions, for users that are involved in particular business areas, for users having particular demographic or economic circumstances, or for users having other characteristics or circumstances. The document customization interface database 126 can include document customization interfaces that are tailored to individual users of the document preparation system 122 based on previous interactions of the users with the document preparation system 122. Accordingly, the document customization interface database 126 includes a plurality of document customization interfaces that can be implemented by the document preparation system 122.

In one embodiment, the document customization interfaces correspond to respective application programming interfaces (APIs). The APIs cause the document preparation system 122 to provide a particular document customization process to the user based on the characteristics of the user. In one embodiment, the user interface module 124 interacts with other components of the document preparation system 122 via the API associated with the selected document customization interface.

In one embodiment, the user computing environment 110 provides user related data 150 to the document preparation system 122. The user related data 150 can include data indicating characteristics of the user. The user related data 150 can include characteristics of the user such as a geolocation of the user, financial data associated with the user, demographic data associated with the user, data indicating characteristics of the user computing environment 110, previous interactions of the user with the document preparation system 122. The user related data 150 can include data expressly selected by the user for provision to the document preparation system 122. The user related data 150 can include data sent by the user computing environment 110 and not expressly selected by the user. The user related data 150 can include data provided from the user computing environment 110 in response to a request from the document preparation system 122. Additionally, or alternatively, the document preparation system 122 can gather user related data 150 from sources other than the user. The sources can include third party financial institutions, third party databases, government databases, social media databases, databases internal to the document preparation system 122 that store data related to users of the document preparation system 120. The user related data 150 can be included in and retrieved from document preparation system data 164.

According to an embodiment, the interface selection module 125 is configured to select a document customization interface from the document customization interface database 126 for individual users of the document preparation system 122. When a user accesses a document customization or custom document importation feature of the document preparation system 122, the interface selection module 125 analyzes the user related data 150 associated with the user. The interface selection module 125 then selects a document customization interface from the document customization interface database 126 based on the user related data 150. The user receives a document customization experience based on the document customization interface selected by the interface selection module 125.

In one embodiment, when the user accesses the document customization feature of the document preparation system 122, the user interface module 124 prompts the user to select the type of document to be imported. The prompt can include a list of document types. The list of document types is selected in accordance with the document customization interface selected by the interface selection module 125. Thus, the user will be presented with a list of possible document types that is tailored to the characteristics of the user. For example, the user may only see document types that are customary in the user's region, that are customary for the user's business, or that are customary based on other characteristics of the user. Document types that are only common to other regions, to other business types, or to other people that are unlike the user will not be displayed in the list of possible document types.

In one embodiment, the document preparation system 122 receives document type selection data 152 from the user. This corresponds to the user selecting a document type from the list provided by the document preparation system 122. For example, if the user selects "invoice" from the list of document types, then the document type selection data 152 indicates that the user has selected an invoice and that the user will upload an invoice template or an example invoice.

In one embodiment, after the user has provided document type selection data 152, the user provides user document data 154 to the document preparation system 122. In one embodiment, the user interface module 124 provides an option for the user to select to upload a document and to browse for the document among the files associated with the user computing environment 110, or among files stored in the document preparation system 122. The user then selects user document data 154 for upload to the document preparation system 122.

As described previously, the user document data 154 includes custom data fields 158. In the example in which the user document data corresponds to an invoice, the custom data fields 158 may include designations such as "price", "date", "tax", "customer name", "customer address", "items purchased", "rate", "hours", "total", and other designations. The custom data fields 158 may not have designations or names that are identical to designations or names of data fields used by the document preparation system 122.

Accordingly, before the document preparation system can generate an invoice using a template corresponding to the user document data 154 by populating data fields with data values corresponding to real transactions with real customers, the document preparation system 122 must map each of these custom data fields 158 to a recognized system data field.

In one embodiment, the document preparation system 122 utilizes the custom form template generation module 132 to import the user document data 154 and to generate custom form template data 140 corresponding to a template in the user document data. The custom form template generation module 132 generates mapping data 138 by mapping each of the custom data fields 158 to a recognized system data field. After the custom form template generation module 132 has successfully generated the mapping data 138, the custom form template generation module 132 generates the custom form template data 140. The custom form template data 140 corresponds to a functioning template that can be utilized by the document preparation system 122 to automatically generate populated document data 146. The custom form template data 140 is the same template as the user document data 154, but mapped to recognized system data fields.

The document preparation system 122 includes a system data field pool 128. The system data field pool 128 includes a plurality of system data fields that are recognized by the system. Each system data field can be associated with a function for populating the system data field with data retrieved from the document preparation system data 164. The system data field pool 128 can include a large number of recognized system data fields for various types of documents and variations on the types of documents based on different characteristics of users.

When the document preparation system 122 receives the document type selection data 152 and the user related data 150, the document preparation system 122, in accordance with the selected document customization interface, selects a relatively small subset of recognized system data fields from the system data field pool 128. The relatively small subset of recognized system data fields is selected based on the document type selection data 152 and the user related data 150. Accordingly, the relatively small subset of recognized system data fields includes recognized system data fields that are most likely to correspond to custom data fields 158 of the user document data 154. The relatively small subset of recognized system data fields excludes recognized system data fields that are most likely irrelevant to the custom data fields 158 of the user document data 154.

In one embodiment, the custom form template generation module 132 utilizes the subset of recognized system data fields in generating the mapping data 138. In particular, the custom form template generation module 132 analyzes the custom data fields 158 in accordance with one or more data field analysis algorithms in order to map each of the custom data fields 158 to a corresponding recognized system data field from the subset of recognized system data fields. Because the subset of recognized system data fields includes a relatively small number of recognized system data fields selected based on their likely relevance to the user document data 154, the custom form template generation module 132 can efficiently and accurately map each of the custom data fields 158 to a recognized system data field. The mapping data 138 indicates the mapping of the custom data fields 158 to recognized system data fields.

In one embodiment, the custom form template generation module 132 generates the custom form template data 140 based on the mapping data 138. Because the mapping data 138 accurately maps custom data fields 158 to recognized system data fields, the custom form template data 140 can be utilized by the document preparation system 122 to generate populated document data 146 for the user. In one embodiment, the document preparation system 122 outputs the custom form template data 140 to the user.

The template storage 134 receives, stores, and provides templates for use by the document generation module 136, according to one embodiment. The template storage 134 includes master templates 142 that are native to the document preparation system 122, e.g., are provided by the document preparation system 122 as a default option for form templates, according to one embodiment. The document generation module 136 provides master templates 142 to the user through the user interface module 124, in response to the request from the user for forms that are inherently, i.e., by default, provided by the document preparation system 122, according to one embodiment. In other words, the document preparation system 122 includes default templates for particular forms and stores the default or master templates in the template storage 134, according to one embodiment. The master templates 142 may not include the format or style of the user document data 154 because the user document data 154 may have been created using a system other than the document preparation system 122, according to one embodiment.

The document preparation system 122 executes the custom form template generation module 132 to receive, organize, store, and provide financial data from one or more users, according to one embodiment. The custom form template generation module 132 uses a number of recognized system data fields to categorize, order, and organize document preparation system data 164, according to one embodiment.

The recognized system data fields can be represented within the document preparation system 122 as a number of different software classes, according to one embodiment. The recognized system data fields include, but are not limited to, one or more of: a due date, an accepted date, an accounts summary date, a service date, a ship date, a date, a company name, a title, an 'accepted by' field, an item, a 'ship via' field, a company tax identification number ("TIN"), a business number, a tracking number, a billing tax number, a company email, a company phone, a company website, a company logo, a company address, a shipping address, a billing address, terms, a message, an item description, an account summary description, company information, an amount due in words, a quantity, a serial number, a tax rate, an amount due, a deposit, a summary tax, a shipping charge, a discount, a subtotal, a tax amount, a tax home amount, a net home amount, a tax, a rate, an amount, and an account summary amount. The recognized system data fields include, but are not limited to, customer name, customer billing address, customer email, customer phone, items, item description, unit price, rate, quantity, total amount, subtotal, tasks, invoice, date, invoice due date, comment, company name, company address, company phone, and company website.

The recognized system data fields include fields that are suitable for personal finances, business finances, educational institution finances, religious institution finances, and finances of other organizations. The custom form template generation module 132 stores and retrieves the recognized system data fields in a table, chart, database, or other data structure, according to one embodiment.

The document preparation system data 164 includes numeric and/or alphanumeric values that are associated with one or more of the recognized system data fields. The document preparation system data 164 includes information entered by a user or retrieved for a user, according to one embodiment. In one embodiment, the document preparation system data 164 is uploaded into the document preparation system 122 with a file, e.g., an .xml file, a .csv file, a spreadsheet file, or the like. The document preparation system data 164 is associated with personal finances, business finances, or other organizational finances and is associated with one or more user accounts, according to one embodiment. The custom form template generation module 132 stores, organizes, and retrieves the document preparation system data 164 in a table, chart, database, or other data structure, according to one embodiment. In one embodiment, the recognized system data fields and the document preparation system data 164 are combined or included in a single database or other data structure.

The document generation module 136 is configured to use the document preparation system data 164 to generate populated document data 146 by populating form templates, according to one embodiment. By populating the form templates with the document preparation system data 164, the document generation module 136 enables a user to efficiently generate invoices, estimates, receipts, and other personal or business forms based on information that the user has already provided or uploaded into the document preparation system 122, according to one embodiment.

The user document data 154 includes user document format data 156 and custom data fields 158, according to one embodiment. The user document format data 156 includes logos, positions of the custom data fields 158, font, background styles, text size, and other characteristics of the custom data fields 158, according to one embodiment. The custom data fields 158 include the information within the user document data 154 that is associated with the user document format data 156, such as a particular customer's name, a company's address, a company phone number, an amount of tax that is due, a date of the invoice, and the like, according to one embodiment.

The custom form template generation module 132 includes one or more optical character recognition engines, text recognition engines, and portable document format ("PDF") conversion engines for converting and/or recognizing text in image files and PDF files and for extracting content from the user document data 154, according to one embodiment. According to various implementations, the custom form template generation module 132 (or another module in the document preparation system 122) incorporates functionality from one or more open-source optical character recognition engines, e.g., FreeOCR, Tesseract, or the like. The custom form template generation module 132 is also configured to recognize text from Word files, Open Office files, other text files, and/or other word processing documents, according to one embodiment.

The custom form template generation module 132 identifies the user custom data fields 158 (e.g., the dynamic data regions), based on input received from the user through the user interface module 124, according to one embodiment. For example, the custom form template generation module 132 enables the user to create a data identifier around one or more custom data fields 158, which the document preparation system 122 converts to custom data fields (e.g., regions in the user form that are to be populated by the document preparation system 122 with the document preparation system data 164), according to one embodiment. The data identifier can include, but is not limited to, a box, a circle, an oval, text highlighting, special characters (e.g., the inequality signs or angle brackets "<" and ">"), a free-form line, or other text identification techniques used around or near the custom data fields 158 to enable the document preparation system to identify the custom data fields 158 within the user document data 154, according to one embodiment. The custom form template generation module 132 causes the user interface module 124 to display a page, a dialog box, a pop-up window, or an interface that includes the information that is identified by the data identifier, according to one embodiment. The user can mark the custom data fields 158 within the user document data 154 either before uploading the user document data 154 into the document preparation system 122, or the user can mark the custom data fields 158 using tools provided by the document preparation system 122 in the user interface module 124, according to one embodiment.

Alternatively, the custom form template generation module 132 is configured to automatically identify the custom data fields 158 (e.g., the dynamic data regions) within the user document data 154, without the application of some kind of data identifier by the user, according to one embodiment.

The custom form template generation module 132 automates the mapping between the custom data fields and the recognized system data fields (e.g., the data fields), according to one embodiment. The custom form template generation module 132 automates the mapping by analyzing each identified custom data field within the user document data 154, according to one embodiment. The custom form template generation module 132 analyzes each custom data field by beginning from an upper left-hand corner of the custom data fields 158, progressing from left to right on the custom data fields 158, and progressing from top to bottom one line at a time on the custom data fields 158, until the bottom right-hand corner of the custom data fields 158, according to one embodiment. In other embodiments, the custom form template generation module 132 analyzes each custom data field using another pattern, using another sequence, or using another prioritization technique.

The custom form template generation module 132 automates the mapping between the custom data fields and the recognized system data fields by identifying/determining the characteristics of each custom data field, according to one embodiment. The characteristics of a custom data field include features that describe the location, function, and/or content of a custom data field, according to one embodiment. The characteristics of the custom data fields include, but are not limited to, a single dot ("."), multiple dots (together or separated), a slash, an at sign ("@"), a hash, an exclamation, a currency symbol, a percentage symbol, a comma, a hyphen, an open bracket, a closed bracket, a year, a month, a location within a table, an alphanumeric character length, small text, a phone number length, purely alphabetical content, purely numerical content, an alphabetic space, a numerical space, an alphanumerical content, an alphanumerical space, an alphanumerical special space, an email address format, a universal resource locator format, a data format, a telephone number format, a partial telephone number, a partial date, a plan number, an amount number, a number ID, a max date on a page, a min date on a page, a column header for a table, a location of a label, a top of the form location of a label, a bottom of the form location of a label, a left side of a form location of a label, a right side of a form location of a label, and a label format, according to one embodiment.

For each characteristic identified for a custom data field, the custom form template generation module 132 evaluates a likelihood of relevance between the custom data field and the recognized system data fields, according to one embodiment. In one embodiment, the custom form template generation module 132 applies a naive bayes classifier technique to the characteristics of the custom data fields to determine the likelihood of relevance between the custom data fields and the recognized system data fields. The custom form template generation module 132 determines for, for each custom data field, the probability that the custom data field matches the system data fields from the subset of system data fields. The custom form template generation module then maps the custom data field to the system data field with the highest probability of matching the custom data field. In one embodiment, the custom form generation module first determines which custom data fields are an exact match for a system data field, i.e. which custom data fields have identical designations to a system data field, before applying the naïve bayes classifier technique to the custom data fields that do not have exact matches to system data fields. In other embodiments, the custom form template generation module 132 uses other statistical, mathematical, logical, or other analytical techniques for determining the likelihood of relevance between the custom data fields and the recognized system data fields.

The custom form template generation module 132 computes or stores the probability/likelihood of relevance between each characteristic and each system field (e.g., each software class) that may be assigned to a custom data field, according to one embodiment. The custom form template generation module 132 determines which characteristics are associated with each custom data field, according to one embodiment. The custom form template generation module 132 can already have the relationship between characteristics and system fields stored in the system. Therefore, when the custom form template generation module 132 determines that a custom data field has a characteristic, the custom form template generation module 132 assigns the pertinent probabilities/likelihoods of relevance (between the system fields and the characteristic) to the dynamic region, according to one embodiment. In one embodiment, the custom form template generation module 132 computes the posterior (e.g., conditional) probability of a characteristic given a system field (e.g., for the class). Alternatively, the custom form template generation module 132 computes a posterior (e.g., conditional) probability of a system field (e.g., for the class) given a characteristic. Additionally, the custom form template generation module 132 may be configured to compute the posterior conditional probability for all of the possible system fields given each of the possible characteristics, according to one embodiment. Although the terms "characteristics" and "system fields" are used herein, it is to be understood that "characteristics" can be referred to as "features" and "system fields" can be referred to as "classes", according to one embodiment.

The document preparation system 122 is configured to map the custom data fields and/or the characteristics of the custom data fields to one or more of a variety of recognized system data fields, according to one embodiment. As mentioned above, the recognized system data fields can be represented within the document preparation system 122 as a number of different software classes, according to one embodiment.

The custom form template generation module 132 can use a number of techniques to determine which system field is most relevant to a custom data field or custom data field, according to one embodiment. In one implementation, the custom form template generation module 132 sums the probabilities of each of the system fields for each of the characteristics of each of the custom data fields. By summing the probabilities of a particular system field over all of the relevant characteristics for a custom data field, one system field should have a probability that is higher than the other system fields, and the custom form template generation module 132 maps the custom data field to the system field having the highest cumulative probability, according to one embodiment. Once the custom form template generation module 132 determines or increases the likelihood of relevance between a custom data field and a particular system field, the custom form template generation module 132 decreases the likelihood of relevance between the particular system field and any other custom data fields, according to one embodiment. If only one custom data field can be assigned to a particular system field, the custom form template generation module 132 can be configured to substantially decrease the likelihood of relevance between the particular system field and the other custom data fields, according to one embodiment. The system fields (e.g., the classes) assigned to a custom data field are sorted from highest probability to the lowest probability, according to one embodiment.

The custom form template generation module 132 is configured to iteratively analyze the system fields that are assigned to the custom data fields, according to one embodiment. If the document preparation system 122 analyzes the custom data fields from the top of the user document data 154 to the bottom of the user document data 154, then the opportunity exists for mapping the same system field to multiple custom data fields. The custom form template generation module 132 is configured to repeat the analysis of all of the custom data fields when a conflict or multiple assignments of a system field are made to more than one custom data field, according to one embodiment. The custom form template generation module 132 repeats the iteration until the conflict is resolved, according to one embodiment. Although highly unlikely, if a particular system field includes the exact same probability for multiple custom data fields, the custom form template generation module 132 can be configured to incorrectly assign the system field to both of the custom data fields so that the user can correct the discrepancy, according to one embodiment.

The custom form template generation module 132 uses the user interface module 124 to display the content of the custom data fields (e.g., the custom data fields 158) with their respectively mapped recognized system data fields, according to one embodiment. The mapped custom data fields and corresponding recognized system data fields can be reviewed and modified by the user in the user interface module 124, according to one embodiment. If there is an error, the user can manually correct the error by selecting the appropriate system field from, for example, a drop-down menu that lists all of the available recognized system data fields, according to one embodiment. The custom form template generation module 132 can be configured to maintain a corrections log, which is based at least partially on changes made by a user to the pre-populated mappings, to enable the document preparation system 122 to incorporate learning and to self-improve the document preparation system 122, according to one embodiment. If a system field is missing from the recognized system data fields, the custom form template generation module 132 enables the user to add custom fields to the recognized system data fields through the user interface module 124, according to one embodiment. By mapping the custom data fields 158 to the recognized system data fields, the document preparation system 122 is enabled to automatically or manually populate the custom user form templates 144 (which are based on the user document data 154) with document preparation system data 164, according to one embodiment.

The document generation module 136 uses the custom form template generation module 132 to create a custom user form template from the user document data 154 that has been mapped to the recognized system data fields, according to one embodiment. The custom form template generation module 132 creates a custom user form template by saving the user document data 154 in an editable format, according to one embodiment. The custom form template generation module 132 saves the created custom user form template in the custom user form templates 144 for future use, according to one embodiment.

The document generation module 136 provides the custom user form templates 144 to the user as template options, through the user interface module 124, to enable the document preparation system 122 to generate the populated document data 146, according to one embodiment. The document generation module 136 generates the populated document data 146 in one of a number of document formats such as, but not limited to, portable document format (".pdf"), extensible markup language (".xml"), office open XML ("OOXML"), open document format (".odt"), portable network graphics (".png"), joint photographic experts group (".jpeg"), and bitmap image file (".bmp"), according to various embodiments.

The populated document data 146 includes the user document format data 156 (from the user document data 154), the recognized system data fields that were automatically mapped and/or manually identified by the user, and the document preparation system data 164 that the document generation module 136 populates into one of the custom user form templates 144, according to one embodiment.

Embodiments of the present disclosure overcome the drawbacks of traditional electronic document preparation systems that require the user to undergo a confusing, inefficient, and error-prone mapping process in order to incorporate a custom user template. Embodiments of the present disclosure also overcome the drawbacks of traditional electronic document preparation systems by providing a personalized interface to the user for incorporating custom form templates and by automatically, accurately, and efficiently mapping custom data field names to system data field names from a customized pool of system data field names based on the characteristics of the user.

Process

Figure 2:
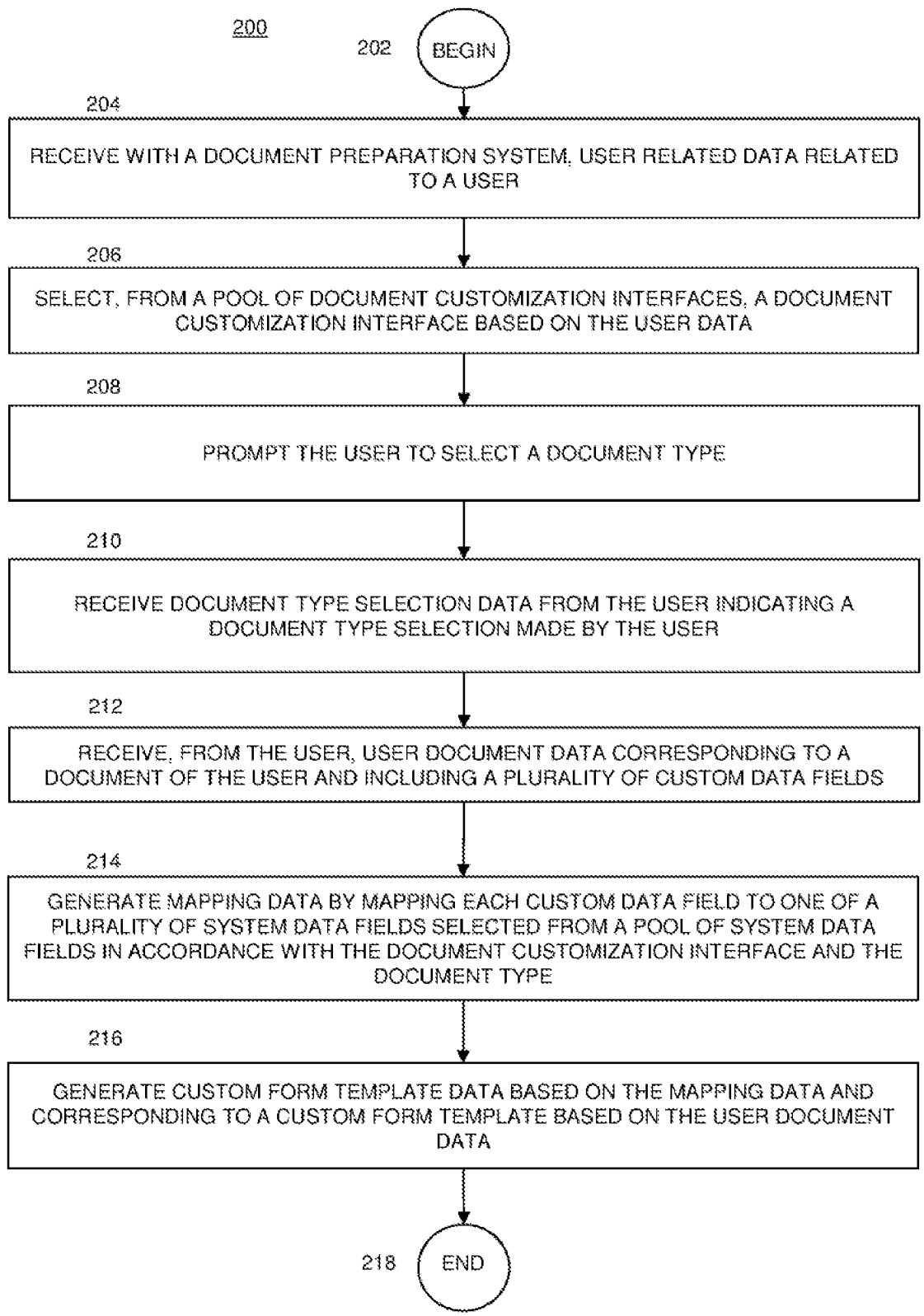
FIG. 2 is a flow diagram of a process for providing customized form templates with a document preparation system, in accordance with one embodiment.

FIG. 2 illustrates a flow diagram of a process 200 for generating a customized document template in a document preparation system, in various embodiments.

In one embodiment, process 200 begins at BEGIN 202 and process flow proceeds to RECEIVE WITH A DOCUMENT PREPARATION SYSTEM, USER RELATED DATA RELATED TO A USER 204.

In one embodiment, at RECEIVE WITH A DOCUMENT PREPARATION SYSTEM, USER RELATED DATA RELATED TO A USER 204, user related data related to a user is received with a document preparation system.

In one embodiment, once user related data related to a user is received with a document preparation system at RECEIVE WITH A DOCUMENT PREPARATION SYSTEM, USER RELATED DATA RELATED TO A USER 204 process flow proceeds to SELECT, FROM A POOL OF DOCUMENT CUSTOMIZATION INTERFACES, A DOCUMENT CUSTOMIZATION INTERFACE BASED ON THE USER DATA 206.

In one embodiment, at SELECT, FROM A POOL OF DOCUMENT CUSTOMIZATION INTERFACES, A DOCUMENT CUSTOMIZATION INTERFACE BASED ON THE USER DATA 206, a document customization interface is selected, from a pool of document customization interfaces, based on the user data.

In one embodiment, once a document customization interface is selected, from a pool of document customization interfaces, based on the user data at SELECT, FROM A POOL OF DOCUMENT CUSTOMIZATION INTERFACES, A DOCUMENT CUSTOMIZATION INTERFACE BASED ON THE USER DATA 206, process flow proceeds to PROMPT THE USER TO SELECT A DOCUMENT TYPE 208.

In one embodiment, at PROMPT THE USER TO SELECT A DOCUMENT TYPE 208, the user is prompted to select a document type.

In one embodiment, once the user is prompted to select a document type at PROMPT THE USER TO SELECT A DOCUMENT TYPE 208, process flow proceeds to RECEIVE DOCUMENT TYPE SELECTION DATA FROM THE USER INDICATING A DOCUMENT TYPE SELECTION MADE BY THE USER 210.

In one embodiment, at RECEIVE DOCUMENT TYPE SELECTION DATA FROM THE USER INDICATING A DOCUMENT TYPE SELECTION MADE BY THE USER 210, document type selection data is received from the user indicating a document type selection made by the user.

In one embodiment, once document type selection data is received from the user indicating a document type selection made by the user at RECEIVE DOCUMENT TYPE SELECTION DATA FROM THE USER INDICATING A DOCUMENT TYPE SELECTION MADE BY THE USER 210, process flow proceeds to RECEIVE, FROM THE USER, USER DOCUMENT DATA CORRESPONDING TO A DOCUMENT OF THE USER AND INCLUDING A PLURALITY OF CUSTOM DATA FIELDS 212.

In one embodiment, at RECEIVE, FROM THE USER, USER DOCUMENT DATA CORRESPONDING TO A DOCUMENT OF THE USER AND INCLUDING A PLURALITY OF CUSTOM DATA FIELDS 212, user document data is received from the user corresponding to a document of the user and including a plurality of custom data fields.

In one embodiment, user document data is received from the user corresponding to a document of the user and including a plurality of custom data fields at RECEIVE, FROM THE USER, USER DOCUMENT DATA CORRESPONDING TO A DOCUMENT OF THE USER AND INCLUDING A PLURALITY OF CUSTOM DATA FIELDS 212, process flow proceeds to GENERATE MAPPING DATA BY MAPPING EACH CUSTOM DATA FIELD TO ONE OF A PLURALITY OF SYSTEM DATA FIELDS SELECTED FROM A POOL OF SYSTEM DATA FIELDS IN ACCORDANCE WITH THE DOCUMENT CUSTOMIZATION INTERFACE AND THE DOCUMENT TYPE 214.

In one embodiment, at GENERATE MAPPING DATA BY MAPPING EACH CUSTOM DATA FIELD TO ONE OF A PLURALITY OF SYSTEM DATA FIELDS SELECTED FROM A POOL OF SYSTEM DATA FIELDS IN ACCORDANCE WITH THE DOCUMENT CUSTOMIZATION INTERFACE AND THE DOCUMENT TYPE 214, mapping data is generated by mapping each custom data field to one of a plurality of system data fields selected from a pool of system data field in accordance with the document customization interface and the document type.

In one embodiment, once mapping data is generated by mapping each custom data field to one of a plurality of system data fields selected from a pool of system data field in accordance with the document customization interface and the document type at GENERATE MAPPING DATA BY MAPPING EACH CUSTOM DATA FIELD TO ONE OF A PLURALITY OF SYSTEM DATA FIELDS SELECTED FROM A POOL OF SYSTEM DATA FIELDS IN ACCORDANCE WITH THE DOCUMENT CUSTOMIZATION INTERFACE AND THE DOCUMENT TYPE 214, process flow proceeds to GENERATE CUSTOM FORM TEMPLATE DATA BASED ON THE MAPPING DATA AND CORRESPONDING TO A CUSTOM FORM TEMPLATE BASED ON THE USER DOCUMENT DATA 216.

In one embodiment, at GENERATE CUSTOM FORM TEMPLATE DATA BASED ON THE MAPPING DATA AND CORRESPONDING TO A CUSTOM FORM TEMPLATE BASED ON THE USER DOCUMENT DATA 216, custom form template data is generated based on the mapping data and corresponding to a custom form template based on the user document data.

In one embodiment, once custom form template data is generated based on the mapping data and corresponding to a custom form template based on the user document data at GENERATE CUSTOM FORM TEMPLATE DATA BASED ON THE MAPPING DATA AND CORRESPONDING TO A CUSTOM FORM TEMPLATE BASED ON THE USER DOCUMENT DATA 216, process flow proceeds to END 218.

In one embodiment, at END 218 the process 200 for generating a customized document template in a document preparation system is exited to await new data and/or instructions.

Figure 3:
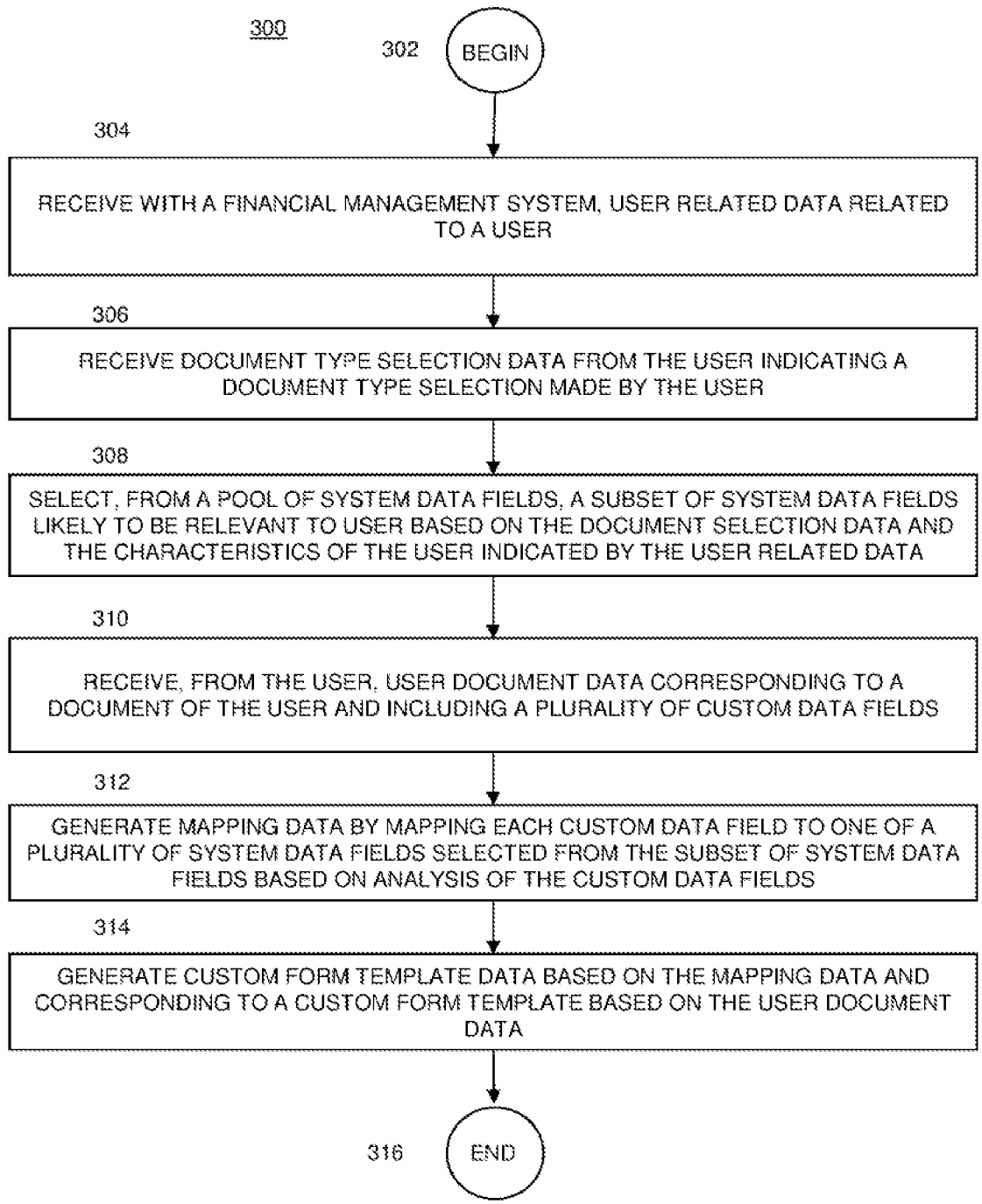
FIG. 3 is a flow diagram of a process for providing customized form templates with a document preparation system, in accordance with one embodiment.

FIG. 3 illustrates a flow diagram of a process 300 for generating a customized document template in a document preparation system, in various embodiments.

In one embodiment, process 300 begins at BEGIN 302 and process flow proceeds to RECEIVE WITH A FINANCIAL MANAGEMENT SYSTEM, USER RELATED DATA RELATED TO A USER 304.

In one embodiment, at RECEIVE WITH A FINANCIAL MANAGEMENT SYSTEM, USER RELATED DATA RELATED TO A USER 304, user related data related to a user is received with a data management system.

In one embodiment, once user related data related to a user is received with a data management system at RECEIVE WITH A FINANCIAL MANAGEMENT SYSTEM, USER RELATED DATA RELATED TO A USER 304 process flow proceeds to RECEIVE DOCUMENT TYPE SELECTION DATA FROM THE USER INDICATING A DOCUMENT TYPE SELECTION MADE BY THE USER 306.

In one embodiment, at RECEIVE DOCUMENT TYPE SELECTION DATA FROM THE USER INDICATING A DOCUMENT TYPE SELECTION MADE BY THE USER 306, document type selection data is received from the user indicating a document type selection made by the user.

In one embodiment, once document type selection data is received from the user indicating a document type selection made by the user at RECEIVE DOCUMENT TYPE SELECTION DATA FROM THE USER INDICATING A DOCUMENT TYPE SELECTION MADE BY THE USER 306, process flow proceeds to SELECT, FROM A POOL OF SYSTEM DATA FIELDS, A SUBSET OF SYSTEM DATA FIELDS LIKELY TO BE RELEVANT TO THE USER BASED ON THE DOCUMENT SELECTION DATA AND THE CHARACTERISTICS OF THE USER INDICATED BY THE USER RELATED DATA 308.

In one embodiment, at SELECT, FROM A POOL OF SYSTEM DATA FIELDS, A SUBSET OF SYSTEM DATA FIELDS LIKELY TO BE RELEVANT TO THE USER BASED ON THE DOCUMENT SELECTION DATA AND THE CHARACTERISTICS OF THE USER INDICATED BY THE USER RELATED DATA 308, a subset of system data fields is selected, from a pool of system data fields, likely to be relevant to the user based on the document selection data and the characteristics of the user indicated by the user related data.

In one embodiment, once a subset of system data fields is selected, from a pool of system data fields, likely to be relevant to the user based on the document selection data and the characteristics of the user indicated by the user related data at SELECT, FROM A POOL OF SYSTEM DATA FIELDS, A SUBSET OF SYSTEM DATA FIELDS LIKELY TO BE RELEVANT TO THE USER BASED ON THE DOCUMENT SELECTION DATA AND THE CHARACTERISTICS OF THE USER INDICATED BY THE USER RELATED DATA 308, process flow proceeds to RECEIVE, FROM THE USER, USER DOCUMENT DATA CORRESPONDING TO A DOCUMENT OF THE USER AND INCLUDING A PLURALITY OF CUSTOM DATA FIELDS 310.

In one embodiment, at RECEIVE, FROM THE USER, USER DOCUMENT DATA CORRESPONDING TO A DOCUMENT OF THE USER AND INCLUDING A PLURALITY OF CUSTOM DATA FIELDS 310, user document data is received, from the user, corresponding to a document of the user and including a plurality of custom data fields.

In one embodiment, once user document data is received, from the user, corresponding to a document of the user and including a plurality of custom data fields at RECEIVE, FROM THE USER, USER DOCUMENT DATA CORRESPONDING TO A DOCUMENT OF THE USER AND INCLUDING A PLURALITY OF CUSTOM DATA FIELDS 310, process flow proceeds to GENERATE MAPPING DATA BY MAPPING EACH CUSTOM DATA FIELD TO ONE OF A PLURALITY OF SYSTEM DATA FIELDS SELECTED FROM THE SUBSET OF SYSTEM DATA FIELDS BASED ON ANALYSIS OF THE CUSTOM DATA FIELDS 312.

In one embodiment, at GENERATE MAPPING DATA BY MAPPING EACH CUSTOM DATA FIELD TO ONE OF A PLURALITY OF SYSTEM DATA FIELDS SELECTED FROM THE SUBSET OF SYSTEM DATA FIELDS BASED ON ANALYSIS OF THE CUSTOM DATA FIELDS 312, mapping data is generated by mapping each custom data field to one of a plurality of system data fields selected from the subset of system data fields based on analysis of the custom data fields.

In one embodiment, once mapping data is generated by mapping each custom data field to one of a plurality of system data fields selected from the subset of system data fields based on analysis of the custom data fields at GENERATE MAPPING DATA BY MAPPING EACH CUSTOM DATA FIELD TO ONE OF A PLURALITY OF SYSTEM DATA FIELDS SELECTED FROM THE SUBSET OF SYSTEM DATA FIELDS BASED ON ANALYSIS OF THE CUSTOM DATA FIELDS 312, process flow proceeds to GENERATE CUSTOM FORM TEMPLATE DATA BASED ON THE MAPPING DATA AND CORRE-

SPONDING TO A CUSTOM FORM TEMPLATE BASED ON THE USER DOCUMENT DATA 314.

In one embodiment, at GENERATE CUSTOM FORM TEMPLATE DATA BASED ON THE MAPPING DATA AND CORRESPONDING TO A CUSTOM FORM TEMPLATE BASED ON THE USER DOCUMENT DATA 314, custom form template data is generated based on the mapping data and corresponding to a custom form template based on the user document data.

In one embodiment, once custom form template data is generated based on the mapping data and corresponding to a custom form template based on the user document data at GENERATE CUSTOM FORM TEMPLATE DATA BASED ON THE MAPPING DATA AND CORRESPONDING TO A CUSTOM FORM TEMPLATE BASED ON THE USER DOCUMENT DATA 314, process flow proceeds to END 316.

In one embodiment, at END 316 the process 300 for generating a customized document template in a document preparation system is exited to await new data and/or instructions.

As noted above, the specific illustrative examples discussed above are but illustrative examples of implementations of embodiments of the method or process for creating customized form templates with a document preparation system to generate customized forms for a user. Those of skill in the art will readily recognize that other implementations and embodiments are possible. Therefore, the discussion above should not be construed as a limitation on the claims provided below.

In one embodiment, a computing system implemented method for generating a customized document template in a document preparation system includes receiving with a document preparation system, user related data related to a user and selecting, from a pool of document customization interfaces, a document customization interface based on the user data. The method includes prompting the user to select a document type, receiving document type selection data from the user indicating a document type selection made by the user, and receiving, from the user, user document data corresponding to a document of the user and including a plurality of custom data fields. The method includes generating mapping data by mapping each custom data field to one of a plurality of system data fields selected from a pool of system data fields in accordance with the document customization interface and the document type and generating custom form template data based on the mapping data and corresponding to a custom form template based on the user document data.

In one embodiment, a computing system implemented method for generating a customized document template in a document preparation system includes receiving with a document preparation system, user related data related to a user and receiving document type selection data from the user indicating a document type selection made by the user. The method includes selecting, from a pool of system data fields, a subset of system data fields likely to be relevant to user based on the document selection data and the characteristics of the user indicated by the user related data. The method includes receiving, from the user, user document data corresponding to a document of the user and including a plurality of custom data fields and generating mapping data by mapping each custom data field to one of a plurality of system data fields selected from the subset of system data fields based on analysis of the custom data fields. The method includes generating custom form template data based on the mapping data and corresponding to a custom form template based on the user document data.

In one embodiment, a system for generating a customized financial document template in a document preparation system includes at least one processor and at least one memory coupled to the at least one processor. The at least one memory has stored therein instructions which, when executed by any set of the one or more processors, perform a process. The process includes receiving with a document preparation system, user related data related to a user, prompting the user to select a document type for importation into the document preparation system, and receiving document type selection data from the user indicating a document type selection made by the user. The process includes selecting, from a pool of system data fields, a subset of system data fields likely to be relevant to user based on the document selection data and the characteristics of the user indicated by the user related data, receiving, from the user, user document data corresponding to a document of the user and including a plurality of custom data fields, and generating mapping data by mapping each custom data field to one of a plurality of system data fields selected from the subset of system data fields based on analysis of the custom data fields. The process includes generating custom form template data based on the mapping data and corresponding to a custom form template based on the user document data and generating populated document data corresponding to a financial document of the user by populating custom data fields of the custom form template data with financial management data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein.

Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for generating a custom form template, the method performed by one or more processors of a system and comprising:
    retrieving a document having a document type and a plurality of data fields;
    selecting a subset of system data fields from a pool of system data fields based on the document type;
    identifying a plurality of custom data fields from the plurality of data fields;
    for each respective custom data field of the plurality of custom data fields:
        determining the probabilistic relevance of each system data field of the subset of system data fields to the respective custom data field based on at least one characteristic of the respective custom data field; and
        identifying a system data field of the subset of system data fields that has the highest probabilistic relevance to the respective custom data field;
    mapping each respective custom data field to its respective identified system data field; and
    generating a custom form template based on the mapping for each respective custom data field of the plurality of custom data fields.

2. The method of claim 1, wherein each custom data field of the identified plurality of custom data fields is different than each system data field of the subset of system data fields.

3. The method of claim 1, further comprising:
populating one or more data fields within a user document based on the custom form template.

4. The method of claim 1, wherein identifying which system data fields have the highest probabilistic relevances to the plurality of custom data fields is further based on at least one characteristic of a system user associated with the document.

5. The method of claim 1, further comprising:
analyzing each respective custom data field of the plurality of custom data fields using at least one of a pattern, a sequence, or a prioritization technique; and
identifying the at least one characteristic of the respective custom data field based on the analyzing.

6. A system for generating a custom form template, the system comprising:
one or more processors; and
at least one memory coupled to the one or more processors and storing instructions that, when executed by the one or more processors, cause the system to perform operations including:
retrieving a document having a document type and a plurality of data fields;
selecting a subset of system data fields from a pool of system data fields based on the document type;
identifying a plurality of custom data fields from the plurality of data fields;
for each respective custom data field of the plurality of custom data fields:
determining the probabilistic relevance of each system data field of the subset of system data fields to the respective custom data field based on at least one characteristic of the respective custom data field; and
identifying a system data field of the subset of system data fields that has the highest probabilistic relevance to the respective custom data field;
mapping each respective custom data field to its respective identified system data field;
mapping each respective custom data field to its respective identified system data field; and
generating a custom form template based on the mapping for each respective custom data field of the plurality of custom data fields.

7. The system of claim 6, wherein each custom data field of the identified plurality of custom data fields is different than each system data field of the subset of system data fields.

8. The system of claim 6, wherein execution of the instructions causes the system to perform operations further including:
populating one or more data fields within a user document based on the custom form template.

9. The system of claim 6, wherein identifying which system data fields have the highest probabilistic relevances to the plurality of custom data fields is further based on at least one characteristic of a system user associated with the document.

10. The system of claim 6, wherein execution of the instructions causes the system to perform operations further including:

analyzing each respective custom data field of the plurality of custom data fields using at least one of a pattern, a sequence, or a prioritization technique; and
identifying the at least one characteristic of the respective custom data field based on the analyzing.

11. A method for generating a custom form template, the method performed by one or more processors of a system and comprising:
retrieving a document having a document type and a plurality of data field indicators, each of the plurality of data field indicators identifying a location of one of a plurality of data fields included in the document, and each respective data field of the plurality of data fields having a data field name indicative of a characteristic of data to be stored in the respective data field;
selecting a subset of system data fields from a pool of system data fields based on the document type, each respective system data field of the subset of system data fields having a system data field name indicative of a characteristic of data to be stored in the respective system data field;
determining, for each respective data field of the plurality of data fields included in the document, whether the data field name associated with the respective data field exactly matches one of the system data field names;
identifying a plurality of custom data fields among the plurality of data fields included in the document, each respective custom data field of the plurality of custom data fields having a data field name that does not exactly match one of the system data field names;
for each respective custom data field of the plurality of custom data fields:
determining the probabilistic relevance of each system data field of the subset of system data fields to the respective custom data field based on at least one characteristic of the respective custom data field; and
identifying a system data field of the subset of system data fields that has the highest probabilistic relevance to the respective custom data field;
mapping each respective custom data field of the plurality of custom data fields to the identified respective system data field; and
generating a custom form template based on the mapping for each respective custom data field of the plurality of custom data fields.

12. The method of claim 11, wherein each custom data field of the identified plurality of custom data fields is different than each system data field of the subset of system data fields.

13. The method of claim 11, wherein identifying which system data fields have the highest probabilistic relevances to the plurality of custom data fields is further based on at least one characteristic of a system user associated with the document.

14. The method of claim 11, further comprising:
analyzing each respective custom data field of the plurality of custom data fields using at least one of a pattern, a sequence, or a prioritization technique; and
identifying the at least one characteristic of the respective custom data field based on the analyzing.

15. The method of claim 1, wherein the retrieved document has a plurality of data field indicators each identifying a location of one of the plurality of data fields in the document.

16. The method of claim 1, wherein each respective data field of the plurality of data fields has a data field name indicative of a characteristic of data to be stored in the respective data field.

17. The method of claim 16, wherein each respective system data field of the subset of system data fields has a system data field name indicative of a characteristic of data to be stored in the respective system data field.

18. The method of claim 17, further comprising:
   determining, for each respective data field of the plurality of data fields in the document, whether the data field name associated with the respective data field exactly matches one of the subset of system data field names.

19. The method of claim 18, wherein each respective custom data field of the identified plurality of custom data fields has a data field name that does not exactly match one of the system data field names.

20. The method of claim 19, wherein each respective custom data field of the identified plurality of custom data fields has a data field name that does not exactly match one of the system data field names.

* * * * *